United States Patent [19]

Houdek et al.

[11] 4,303,728
[45] Dec. 1, 1981

[54] METHOD FOR PRODUCING FOAMED COMPOSITE PANELS AND RESULTANT PRODUCT

[75] Inventors: Ladd E. Houdek, Saline; Frank G. Cespino; Patrick A. Yezbick, both of Canton, all of Mich.

[73] Assignee: Ford Motor Company, Dearborn, Mich.

[21] Appl. No.: 109,450

[22] Filed: Jan. 4, 1980

[51] Int. Cl.³ .......................................... B29D 27/00
[52] U.S. Cl. .................................. 428/315; 264/46.5;
    264/46.8; 264/DIG. 83
[58] Field of Search ................... 264/46.5, 46.6, 46.8,
    264/DIG. 83, 51

[56] References Cited

U.S. PATENT DOCUMENTS

| 3,090,078 | 5/1963 | Ackles | 264/46.5 |
|---|---|---|---|
| 3,172,925 | 3/1965 | Preotle | 264/46.5 |
| 3,265,783 | 8/1966 | Jacobs | 264/46.5 |
| 3,626,044 | 12/1971 | Arnaud | 264/46.5 |
| 3,655,840 | 4/1972 | Krug | 264/46.8 |
| 3,691,265 | 9/1972 | Cobbledick | 264/46.6 |
| 3,703,571 | 11/1972 | Roberts | 264/46.6 |
| 3,705,222 | 12/1972 | Rogers et al. | 264/46.5 |
| 3,711,581 | 1/1973 | Fowler, Jr. et al. | 264/46.5 |
| 3,712,778 | 1/1973 | Lidl | 264/DIG. 83 |
| 3,773,875 | 11/1973 | Lammers | 264/46.7 |
| 3,795,722 | 3/1974 | Sassaman | 264/46.4 |
| 3,816,837 | 6/1974 | Smith | 264/46.5 |
| 3,846,525 | 11/1974 | Kinne et al. | 264/46.5 |
| 3,917,779 | 11/1975 | Breer et al. | 264/46.5 |
| 3,950,462 | 4/1976 | Shaffer et al. | 264/46.8 |
| 3,954,537 | 5/1976 | Alfter et al. | 264/46.8 X |
| 3,991,147 | 11/1976 | Knipp et al. | 264/51 |
| 4,025,372 | 5/1977 | Fenton | 260/347.5 |
| 4,075,304 | 2/1978 | Watson | 264/46.5 |
| 4,115,170 | 9/1978 | Sanson | 156/79 |
| 4,129,636 | 12/1978 | Boden et al. | 264/51 |
| 4,150,074 | 4/1979 | Tilgner | 264/51 X |

FOREIGN PATENT DOCUMENTS

| 2264523 | 3/1974 | Fed. Rep. of Germany | 264/46.6 |
|---|---|---|---|
| 1201040 | 8/1970 | United Kingdom | 264/DIG. 83 |
| 2002673 | 2/1979 | United Kingdom | 264/DIG. 83 |

OTHER PUBLICATIONS

Mobay, "The Rolling Showcase for Engineering Plastics", Pittsburgh, Pa., Mobay Chemical Company, 1968.
Miller, Bernie, Executive Editor, "Reaction-Molded Urethanes-They're, in Production Right Now", RN *Plastics World,* Sep. 16, 1974, pp. 42–45.

*Primary Examiner*—Philip Anderson
*Attorney, Agent, or Firm*—Peter D. McDermott; Olin B. Johnson

[57] ABSTRACT

Instrument panels or other such panels are made by injection and distribution of foam precursors into a cavity between rigid and flexible sheets tightly clamped at their borders. FIG. 3 shows relative portion of rigid sheet (A), flexible sheet (B) and mold members (M1) and (M2). Injection preferably occurs through an injection port at a parting line between (M1) and (M2) defined also by sheets (A) and (B).

24 Claims, 9 Drawing Figures

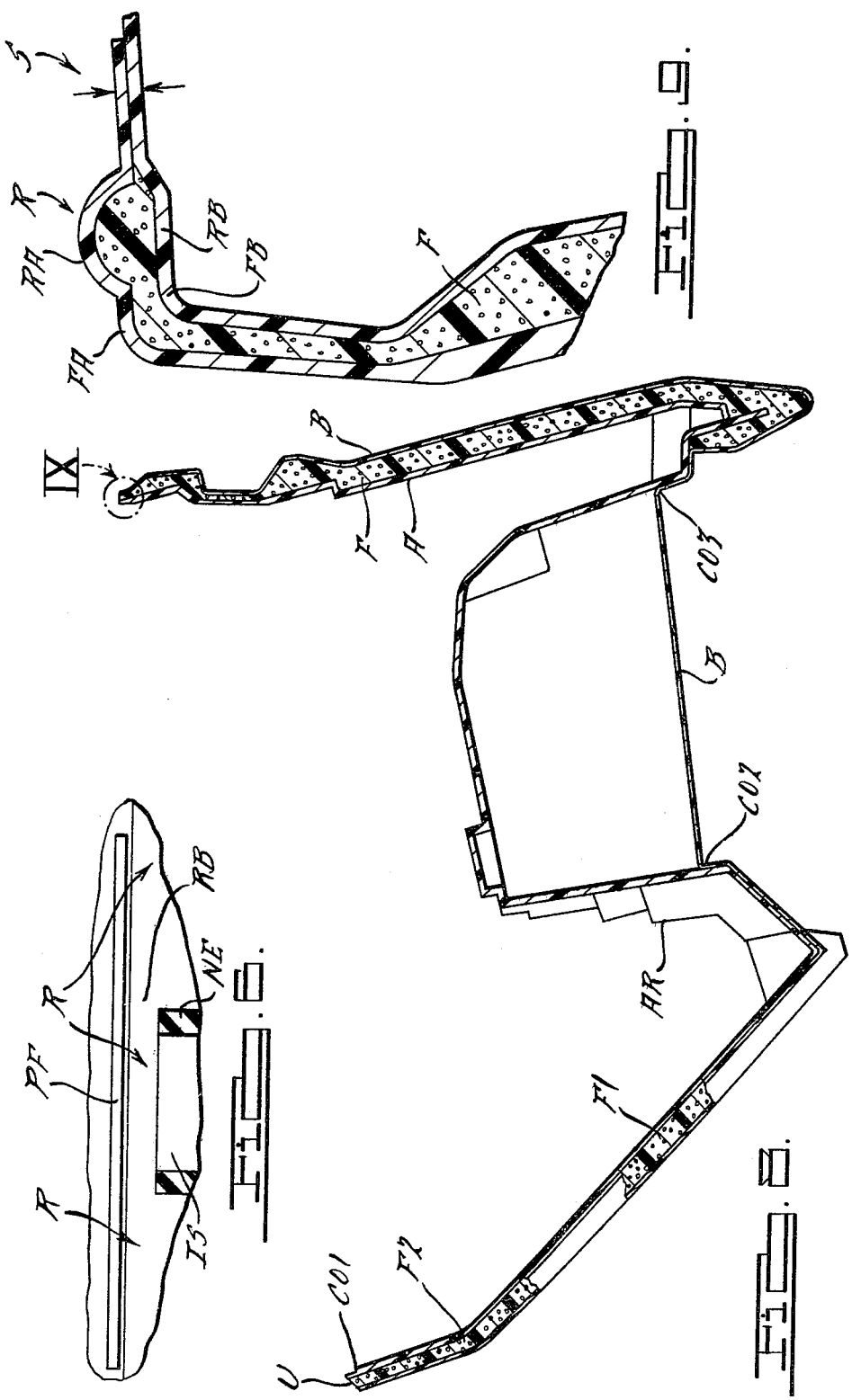

METHOD FOR PRODUCING FOAMED COMPOSITE PANELS AND RESULTANT PRODUCT

BACKGROUND OF THE INVENTION

This invention relates especially to manufacture of highly contoured, structural panels having complexly shaped foam interior and soft, decorative front. More particularly, this invention relates to provision of these and other panels in stationary molds. This invention finds particular use in production of vehicular instrument panels.

Instrument panels have been made in the past by, for example, a conveyor method. In the conveyor method, mold tools move on a carrousel between operative stations. At these stations, operators or devices perform such functions on moving tools as open, clean, apply mold release, insert one or more sheets, pour or otherwise apply foam precursors etc. Typically in the conveyor method the force used to clamp mold halves is low.

The conveyor method is satisfactory in many respects. This invention, however, offers significant advantages relative thereto. These advantages include, but are not limited to: flexibility in foam precursor choice since cure is not related to tool movement; better yields since uniform clamping force can result in fewer mold cleanings, less foam waste, better quality, reduced tool wear etc.; quicker identification of problem areas since individual panels can be readily associated with particular tools; fewer molds for equivalent production; fewer operators associated with each panel; more sensitivity to volume changes since not all stations need operate; built in tool advantages such as vacuum assists can be made more readily, if desired.

Still other advantages will become apparent from the hereinafter disclosure.

BRIEF DESCRIPTION OF THE DRAWINGS

FIG. 5 is a view of the apparatus of FIG. 5 looking in from the cavity between sheets A and B.

FIG. 6 is a developed view taken to show further relative positions of the injection spout of FIGS. 4 and 5 and prefoam piece PF.

FIG. 8 is a cross sectional portion of a panel made in accordance with this invention. Rigid and plastic sheets are shown with foam therebetween.

FIG. 9 is a cross section (in an exploded view) of another part of the panel in FIG. 8. This exploded view shows runner R and gate G with foam therein.

BRIEF DESCRIPTION OF THE INVENTION

This invention relates especially to making contoured, structural panels of foam interior. This invention, more particularly, relates to manufacture of panels such as these in stationary molds.

In large scale practice of this invention, fluidically interdependent stations produce panels sequentially in concert with electrical prioritizing control. An operator at any one of such stations positions sheets to provide a cavity in a mold and then signals for activation of an associated injection nozzle. The nozzle, being in fluid communication with others, receives activation from a control which prioritize activation signals. With activation, the nozzle injects fluid precursors into the cavity.

At each station, first and second mold members, generally conforming interiorly to respective interiorly contoured first and second sheets, clamp tightly together on peripherial (and selected interior, if desired) portions of the sheets so as to maintain a relatively thin, contoured cavity therebetween. The cavity has a trough-like shape and, preferably, prior to injection, positioned with an edge higher than its middle. Injection of the foam precursors preferably occurs at such an edge of a so positioned cavity.

Distribution of foam precursors occurs through directed flow within the cavity and by the foaming reaction itself. More particularly, injection of foam precursors is into a runner. The runner extends along a peripherial portion of the cavity in preferred embodiments and communicates with a gate. The gate insures the precursors travel along the runner and meters them into the rest of the cavity. The precursors exit from the gate in a flow front. The flow front wets a large portion of the cavity in its travel in the cavity. Gelling and blowing reaction proceed to complete wetting and filling of the cavity with foam.

DETAILED DESCRIPTION OF PREFERRED EMBODIMENTS

In general terms, this invention provides a method for manufacture of panels in stationary molds at individual press stations that have interdependent injection sites.

Figure 1:
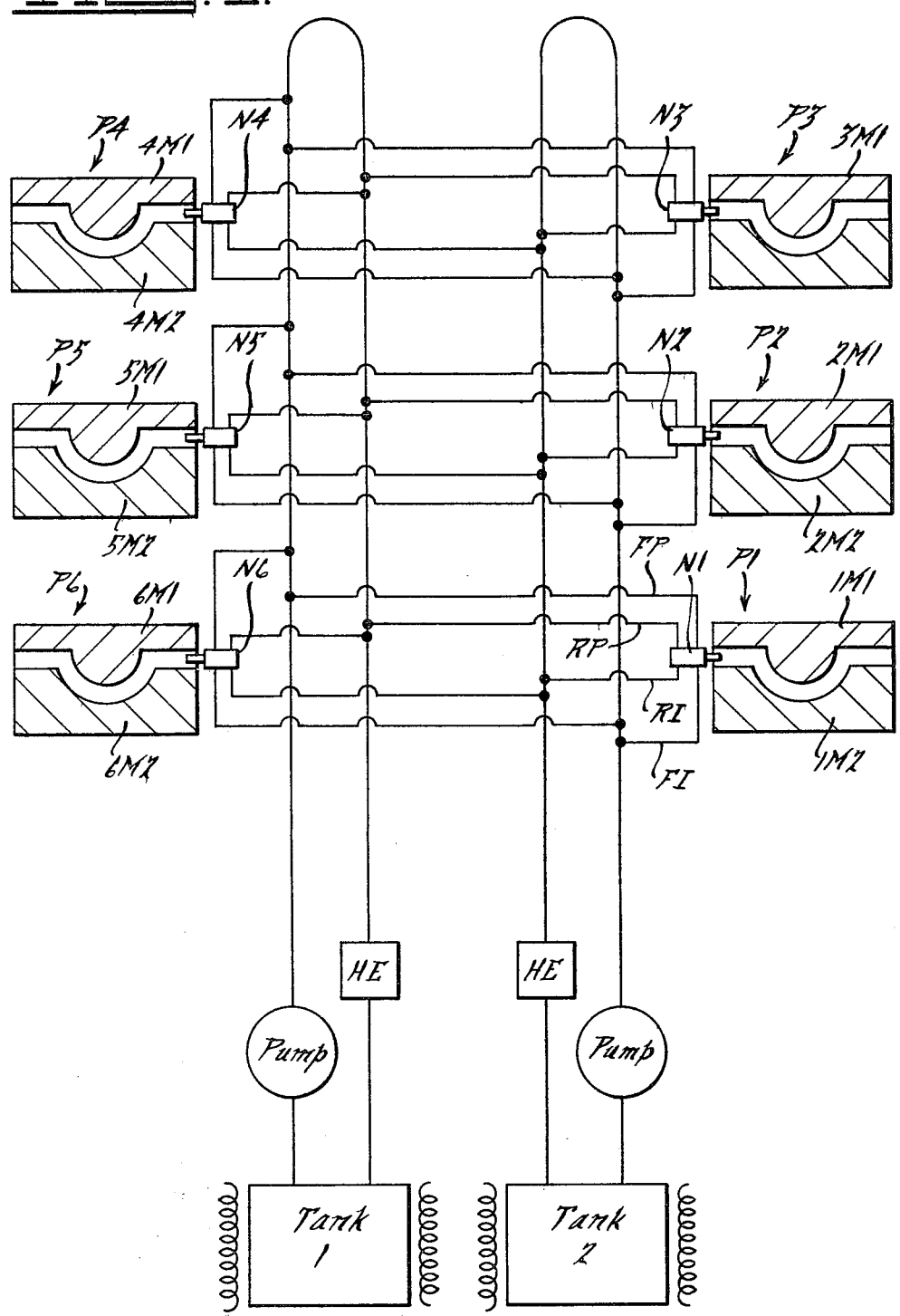
FIG. 1 illustrates schematically an apparatus in which panels may be produced in accordance with this invention. The apparatus has six presses P1–P6, associated injection apparatus N1–N6 and precursor feed (e.g., FI and FP) and return (e.g., RI and RP) for each. Presses P1-P6 are stationary. Operators at these presses position rigid and flexible sheets between associated mold member pairs, 1M1 and 1M2, 2M1 and 2M2 etc. The mold members close so as to maintain a cavity between the sheets. The cavity receives programmed amount of foam precursors from an associated injection nozzle N 1-6. Common feed lines provide pressure and temperature control of the foam precursors.

FIG. 1 illustrates schematically in simplified form general manufacturing apparatus for production of panels in accordance with this invention. FIG. 1 shows six press locations, P1 through P6, where individual panels are made. Within each press, P1 through P6, there are respective mold pairs (1-6) M1 and M2 which may be the same or different in configuration. Likewise each press P1-P6 has an associated injection nozzle N1-N6 for injection of foam precursors.

During manufacture of panels, operators position a rigid sheet and a flexible sheet (not shown) between one of the mold pairs, e.g. 3M1 and 3M2. The press, e.g. P3 closes so as to maintain a cavity between the sheets. Injection of precursors into the cavity then occurs by activation of an associated injection nozzle, e.g. N3, after which the precursors foam and cure in the mold. The operator then opens the press and removes the panel. Thereafter, the operator positions two more new sheets between the mold pairs and so continues making panels.

Each injection nozzle N1-N6 has static feed (e.g., FP1, FI1), and return (e.g., RP1, RI1) lines. The feed and return lines communicate with respective ring line and tank. A pump maintains pressure in the ring line. Activation of an injection nozzle causes purge of the nozzle. Purge occurs by opening feed and return lines at the ring line. Closure of the return line thereafter provides pressure for impingement mixing of components during injection. A control device monitors precursor conditions and prioritizes activations.

Figure 2:
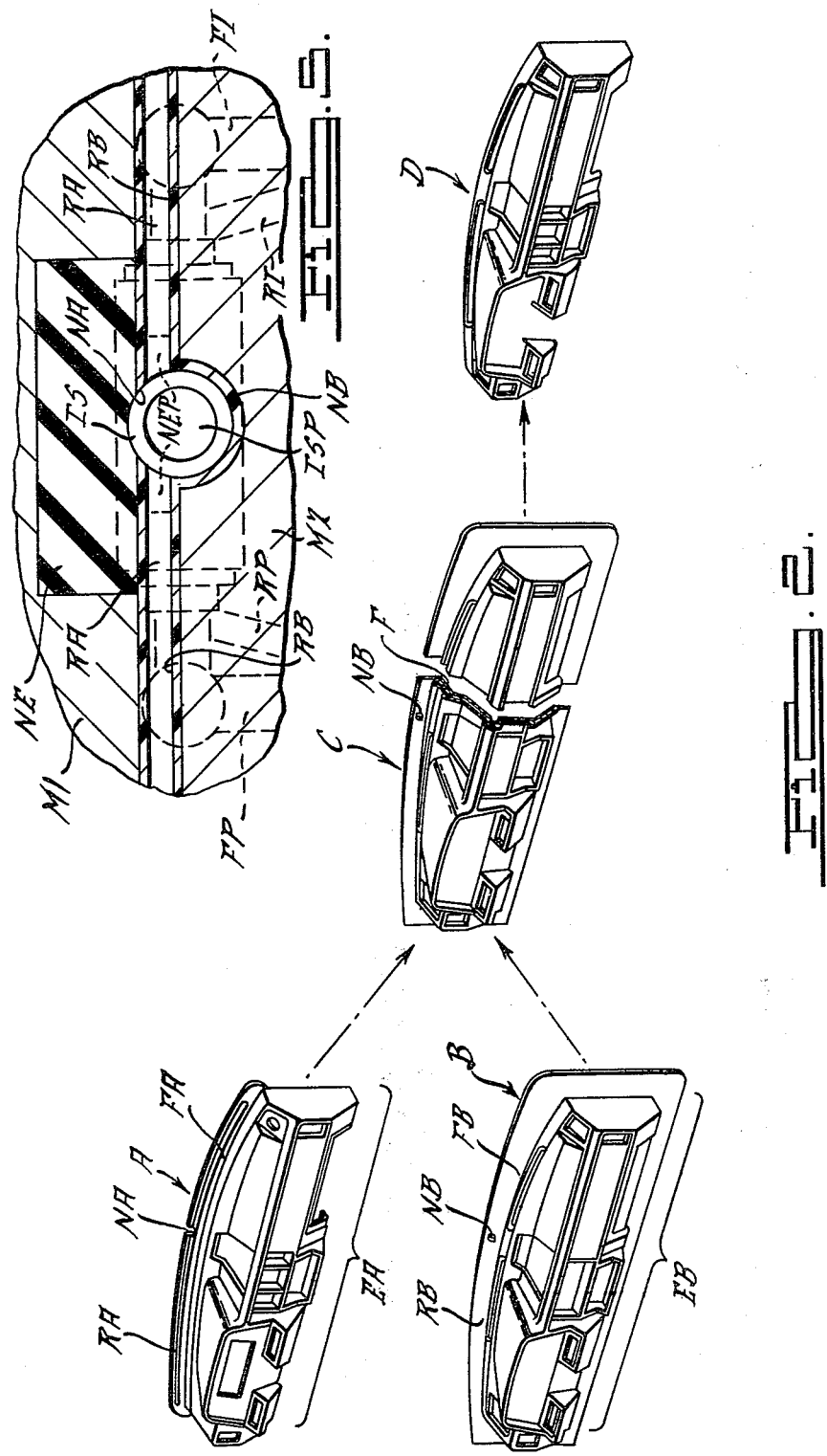
FIG. 2 illustrates general steps and materials in making a vehicular instrument panel in accordance with this invention. A rigid sheet A and a flexible sheet B are separately formed by convenient technique. Thereafter, mold members tightly clamp border portions (except for the portion between EA and EB) to maintain a cavity therebetween. Injection of foam precursors occurs at an injection port. The injection port communicates with a runner formed between RA and RB in the cavity. Distribution and cure of the foam precursors provide panel C. Panel C is die cut to provide panel D.

FIG. 2 illustrates materials and steps in making a panel (vehicular instrument panel) in accordance with this invention. Sheet A is relatively rigid and has been injection molded from filled plastic. Sheet B is relatively flexible and has been vacuum formed from a vinyl resin. Mold members (not shown) clamp together borders of rigid and flexible sheets A and B to maintain a cavity for receipt of foam precursors. Distribution and cure of the foam precursors provides panel C with foam F therein. Thereafter, die cutting of panel C provides panel D of desired configuration.

Sheet A in FIG. 2 has rounded portion or runner half RA and gate half FA. Runner half RA has been formed during injection molding and projects from the surface of sheet A in a shape like a tube or conduit half. Gate half FA is a section just after runner RA. Similarly, sheet B has runner half RB and gate half FB. When the mold members close on sheets A and B so as to maintain a cavity therebetween, RA and RB form a runner and FA and FB form a gate within the cavity.

Sheet A in FIG. 2 has a notch NA in runner half RA for receipt of a portion of an injection nozzle. Sheet B has a molded portion NB for receipt of another portion of the injection nozzle. The mold member which holds sheet A preferably also carries the injection nozzle. When the mold members close, the injection spout of the nozzle fits into NA and NB so that it communicates directly with the runner formed between RA and RB.

Figure 3:
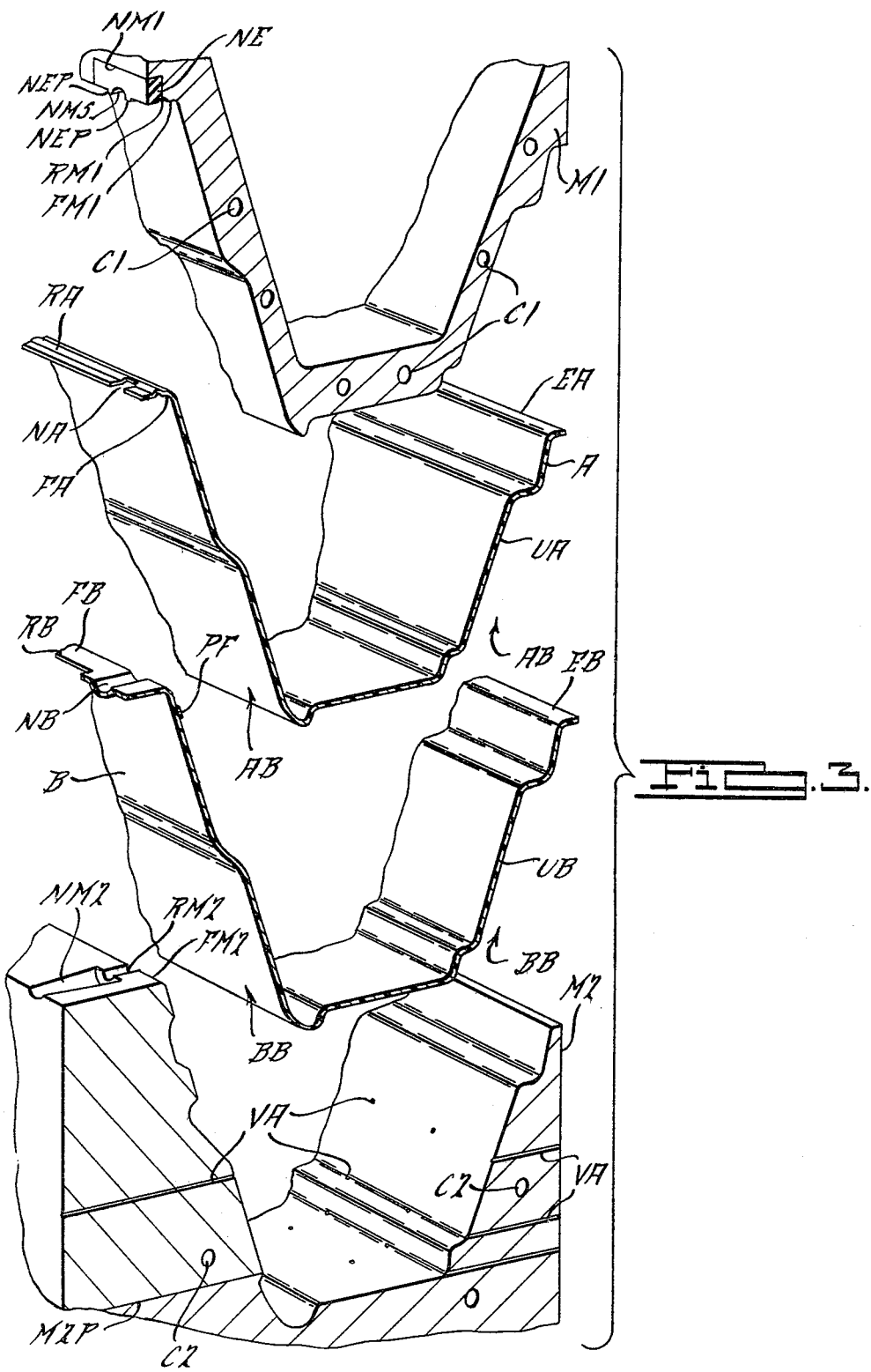
FIG. 3 shows relative positions of mold members M1 and M2 and rigid and flexible sheets A and B. Notch NM1 in mold member M1 retains elastomer NE. Elastomer NE partially surrounds an injection spout of an injection nozzle. The injection spout also fits into notch NA and on notch NB.

FIG. 3 shows, for purposes of better explanation, a section illustrating more particularly relative positions of mold members M1 and M2 and rigid and flexible sheets A and B in an embodiment such as described relative to FIGS. 1 and 2. Mole members M1 and M2 (made from epoxy or the like) are mounted on upper and lower platens, respectively, of a 50 ton press (neither shown). The platens rotate about a horizontal axis to facilitate operator manipulations. Sheets A and B have been molded and conform generally to mold members M1 and M2, respectively.

In preparation for injection of foam precursors, an operator positions sheets A and B on mold member M2 which is rotated so its cavity faces the operator. Sheet A has molded projections AR (shown in FIG. 8) that fit into holes made in mold member M1. These projections enable alignment in mold member M1. Optional, but preferred vacuum assists VA in mold member M2 hold sheet B in position. Mold members M1 and M2 rotate, after placement of sheets A and B, so as to permit vertical closure. In closed position, sheets A and B form a trough-like cavity that is selectively closed.

Mold members M1 and M2 hold together sheets A and B at most of their borders to contain the foaming reaction. The mold members maintain at least about 15 psi in a vertical direction at these borders. A portion of the borders of A and B is not clamped, however, so as to permit air exhaust during foaming operation, as hereinafter more particularly described.

As shown in FIG. 3, sheets A and B have respective runner halves RA and RB and respective gate halves FA and FB. When mold members M1 and M2 close, mold runner positions RM1 and RM2 of M1 and M2, respectively, contact respective runner halves RA and RB so as to maintain a runner therebetween. Similarly, mold gate positions FM1 and FM2 in M1 and M2, respectively, contact respective fan gate halves FA and FB so as to maintain a gate therebetween.

To provide an injection port, sheets A and B have respective notches NA and NB, which, in turn, interrupt, respectively, runner halves RA and RB. NA cuts into sheet A to the middle of runner half RA. A portion of an injection nozzle, at its spout, fits into NA and contacts the remainder of runner half RA (shown more particularly in FIG. 5). NB is a molded portion in sheet B that receives another portion of the injection nozzle spout.

Adaptations in mold members M1 and M2 shown in FIG. 3 further enable a sealing engagement at the injection port. The engagement also provides a cushion at the injection port. Mold member M1 has notch NM1 that retains elastomer NE. Elastomer NE has notch NMS that receives a portion of the spout portion of an injection nozzle. Elastomer NE has projections NEP that fit into notch NA around the injection spout and contact notch NB when M1 and M2 close.

Notch NB fits into notch NM2 of mold member 2. When mold members M1 and M2 close, elastomer NE cushions misalignment of the injection nozzle carried by mold member M1, as is more particularly described by FIGS. 4, 5 and 6.

Upon closing of mold members M1 and M2, sheets A and B thus form a cavity that has injection port, runner, and gate as previously described. Additionally, a slight opening between mold members M1 and M2 allows exhaust of air from the cavity. Exhaust of air preferably occurs along a side away from injection, e.g. between border portions EA and EB (also shown in FIG. 2) of sheets A and B. The foam precursors thus enter the injection port, travel along the runner and are metered into the cavity through the fan gate. Prefoamed pieces such as PF divert the foam precursors at desired locations within the cavity.

The foam precursors exit as a flow front from the fan gate and travel into the bottom of the cavity. The flow front enables desirable wetting of the cavity between sheets A and B before entry to the bottom (i.e. an area between around AB and BB) of the cavity.

At the bottom of the cavity, the foam precursors cream (i.e. change in viscosity) and gel begins. Also, a blowing reaction accelerates and causes further expansion and travel of creamed precursors into upward side of the cavity between UA and UB in FIG. 3. Foaming continues to force the precursors to a narrow gap between A and B at EA and EB whereupon foaming flow preferably stops. Continued pressure by mold members M1 and M2 against sheets A and B during foaming insures proper filling and conformity of the finally cured foam to the cavity created between A and B.

Upon sufficient completion of cure of the foam, there is release of pressure against mold member M1 and it is lifted from the cured panel. Hydraulic cylinders part mold member M2 at M2P so that the die locked panel may be removed.

Figure 4:
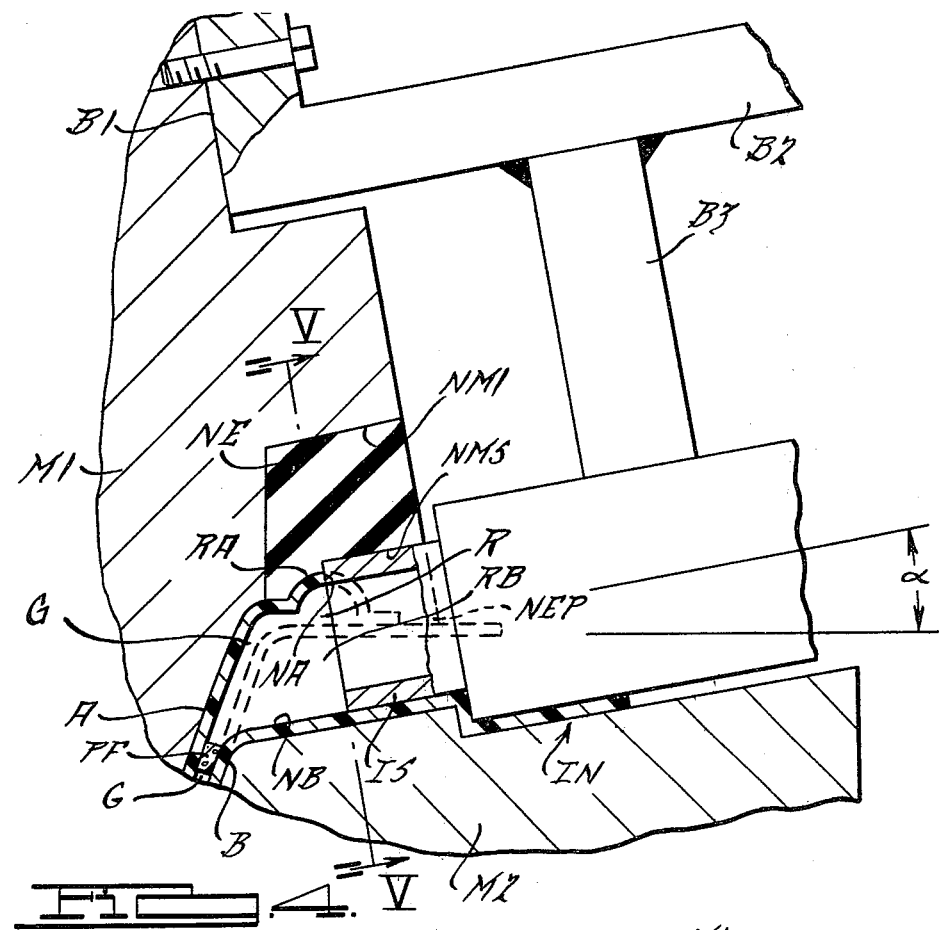
FIG. 4 illustrates injection apparatus for injection of foam precursors into a cavity formed between sheets A and B as in FIG. 3.

FIG. 4 shows more particularly relative closed position of mold members M1 and M2, injection spout IS of injection nozzle IN and a portion of the cavity between sheets A and B prior to injection of foam precursors. FIG. 5 is a view of injection nozzle IN looking in from the cavity around V—V. Injection nozzle IN mounts to mold member M1 through mounting members B1, B2 and B3 as shown in FIG. 4. Injection nozzle IN contains a mixing head of conventional (and commercially available from EMB) design (not shown) for mixing of foam precursors by impingement under pressure of feed streams FP and FI. Prior to such mixing, a contoured piston within the nozzle IN allows continuous recirculation of individual foam precursors through respective feed and returns FP and RP and FI and RI. Withdrawal of the piston then permits impingement and mixing of the precursors upon one another under pressure. In the feed lines FP and FI, pressure is about 2000-2500 psi during activation. Within the mixing head of injection nozzle IN, pressure may be as high as 2500 psi.

As seen in FIG. 4, injection nozzle IN comprises injection spout IS which communicates directly with the cavity between sheets A and B at runner R. Injection spout IS fits between notch NMS of elastomer NE and molded notch NB in sheet B. An end portion of the injection spout IS fits tightly against notch NA where it cuts into runner half RA.

Mold member M1 carries injection nozzle IN at an angle of about 10°-15° from horizontal. This is to prevent repeated closures of M1 and M2 from damaging it, particularly injection spout IS and piston IPS. Rather, misalignment in closure of M1 and M2 will cause rotation of nozzle IN and spout IS about an axis where B1 and B2 join together. Moreover, elastomer NE made of polyurethane or the like, serves to cushion injection nozzle IN and spout IS.

Notch NB, molded into sheet B and shown also in FIG. 5, receives injection spout IS. Elastomer NE, when mold members M1 and M2 close, surrounds the upper portion of injection spout IS and forms a seal by projections NEP with notch NB to reduce or prevent leakage of foam precursors. Also, elastomer NE contacts and forms a seal against the lateral sides of notch NA.

As seen in FIGS. 4 and 6, prefoam piece PF is in a position to divert flow of foam precursors as they enter the cavity. Alternatively, or additionally, if desired, molded projections (not shown) in sheet A or B or M2 may serve similar function. Similarly, inner areas between sheets A and B may be clamped by mold members M1 and M2 at projections molded into M1 and M2. For example, sheet A may comprise openings around which mold members M1 and M2 clamp sheet B. Sheet B may be die cut away around the opening after foam cure.

FIG. 6 shows the length of prefoam piece PF relative to inject spout IS outer diameter. While PF is not required, it does assure further mixing of the precursors, particularly as to initial composition injected. Furthermore, PF diverts flow within the cavity along the runner.

Figure 7:
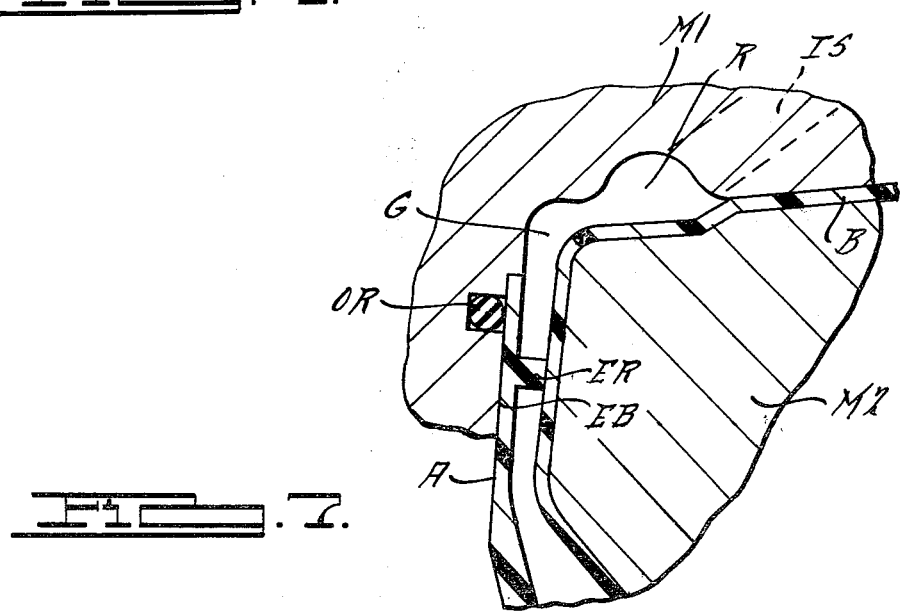
FIG. 7 illustrates an alternative embodiment of this invention. Upper mold member M1 serves as a part of cavity definition.

FIG. 7 shows an alternative embodiment with respect to runner and gate sections in the cavity between sheets A and B. In this embodiment, mold member M1 serves to define a portion of runner R and gate G. Seal OR engages sheet A to contain foam precursors. Stand off rib ER, molded into sheet A, maintains relative position of sheets A and B. Gaps between ER and other ribs allow passage of foam precursors into the cavity. Injection spout IS extends through mold member M1 to runner R. Coolant pipes C1 maintain temperature of mold member M1 around runner R since sheet A no longer acts as insulator.

Although one or both of mold members M1 and M2 may be heated, e.g. between about 30°-50° C., more preferably 30°-40° C., in accordance with this invention, commercially available nozzle mixing heads (e.g. made by EMB, Admiral, etc.) for injection of foam precursors may be used. Conducts such as C1 and C2 (FIGS. 3, 7) permit circulation of fluid, e.g. water in mold members M1 and M2, for temperature control. Temperature control assists uniform and desired gelling and foaming reactions. Normally, if heat is desired during foaming reaction, such heat is applied to mold member M2 or the member holding the flexible vinyl sheet.

FIGS. 8 and 9 illustrate a section of a foamed instrument panel made in accordance with this invention. The border areas (i.e. runners and gate at X and exhaust port at Y) in the section of FIG. 5 have been cut away. FIG. 9 is an exploded view of the runner and gate cut away at X.

FIG. 8 shows a portion of the panel which has areas with and without foam. The area between CO1 and CO2 will be die cut and serve as an opening for the steering column (as seen more particularly in FIG. 2). The portion of sheet B between CO2 and CO3 will be die cut away and serve as a location for an instrument cluster. The rigid sheet A between CO2 and CO3, however, will be selectively die cut to leave supporting bracketing for the cluster.

In FIG. 8, ribs AR may be seen. Ribs AR serves as a harness for wire or other items held by sheet A in use. Additionally, AR may serve to align sheet A in respect to mold member M1 and, consequently, M2 and sheet B.

As can be seen from FIG. 8, the foam advantageously completely fills desired portions between sheets A and B including that portion adjacent the steering column opening shown by cut away F1 and F2.

FIG. 9 shows more particularly runner R (formed between runner halves RA and RB) and gate G (formed between fan gate halves FA and FB) used to program flow of foam precursors into the panel. Additionally, the border portion S of sheets A and B is shown which, when clamped together by the mold members, serve to contain foam precursors during injection and foaming. The clamp force at S is, as mentioned, at least 15 psi.

The foam precursors preferably comprise an isocyanate and polyol, as previously mentioned. Essential to preferred operation of this invention is a proper balance of gelling and foaming or blowing reactions. Achievement of this balance has been accomplished by polyurethane precursor compositions of certain viscosity and reactivity.

More particularly, preferred polyurethane precursor compositions comprise two liquid components, one of which is a aromatic di- or polyisocyanate of relatively high molecular weight and viscosity preferably between about 100–1000 centipose at 25° C., more preferably 200–500 centipose at 25° C. The aromatic di- or polyisocyanate preferably comprises mixtures of monomeric diisocyanates and high molecular weight oligomers thereof.

A second component for the foam precursors preferably comprises polyol (polyol as used herein means diol, triol or other polyhydroxy compound), as mentioned, and more preferably a mixture of diol and triol of relatively high molecular weight along with a polyhydroxy compound of relatively low molecular weight. The polyhydroxy compound serve particularly as a short chain crosslinker which hastens cure of the polyol.

Also included in the polyol component is catalyst to hasten cure. Furthermore, water in the polyol component serves as a blowing agent. The catalyst preferably comprises a gelling catalyst and a blowing catalyst. The gelling catalyst is a reactive nitrogen based compound, particularly a cyclic amine (e.g. diazobicyclooctane) or hydroxy amine and/or a metal (e.g. a tin carboxylate) compound. Amine-based catalysts are used also for the blow reactions.

The following examples illustrate preferred aspects of this invention but are not deemed limiting thereof.

EXAMPLE 1

Approximately 1.4 kg of foam precursors is injected through an 11 mm. nozzle into the cavity between sheets A and B as generally illustrated in FIGS. 1–6 as described hereinbefore. Sheet A is an injected molded Dylark 238–F20 (about 20% glass by weight). Sheet B is a vinyl-ABS vacuum formed sheet. The mold halves are epoxy based material and are maintained by water circulation at a temperature of about 90° F. A slight vacuum in mold member M2 is maintained to hold sheet B in place. The runner has a height of about 0.25 inches and the gate a height of between about $6.0 + 2.0 \times 10^{-2}$ inches. The exhaust vent is between about $2-10 \times 10^{-2}$ inch in height. The injection is completed in about 4 seconds with polyurethane foam precursors having a cream time of about 6–10 seconds. The foam reaction is exothermic with a peak temperature of about 180° F. Expansion is complete in about 50–60 seconds. Curing takes about 2½ minutes whereupon the mold members are opened and the panel removed. The foam between the panel has a density between about 6–8 cu. ft./lb.

The foam precursor composition employed is a two component composition mixed together under pressure prior to injection. The ingredients are as follows:

| | Parts by Weight |
|---|---|
| Component A | |
| Mondur MR' (comprises methylene - bis (4-phenyl isocyanate) and higher molecular weight oligomers thereof available from Mobay Chemical Co.) | 45.3 |
| Component B | |
| Poly G 85-28[1] (Triol) | 75.5 |
| Poly G 55-28[1] (Diol) | 17.5 |
| Poly G 71-53[1] (Sucrose Polyol) | 7.0 |
| Water | 2.2 |
| Carbon Black | 1.0 |
| Formez UL 1[2] | 0.00035 |

-continued

| | Parts by Weight |
|---|---|
| Dabco X - 795[3] | 0.8 |

[1]Poly G 85-28, 55-28 and 71-531 are polyol products (made by ethoxylation reaction) of Olin having, respectively, molecular weights (MW) and hydroxyl numbers (OH) of: 6500 and 28; 4000 and 28; and below 1000 and 531.
[2]Formez UL - 1 is a product of WITCO and is an organot in carboxylate.
[3]Dabco X-795 (lot 79-M-59) is a tertiary amine available from Air Products.

Component A has a viscosity at 25° C. of about 300–400 centipose. Component B has a viscosity of about 2000 cp at 25° C.

A panel in accordance with that depicted in FIGS. 8 and 9 is produced.

EXAMPLE 2

The procedures of Example 1 are generally followed except that the nozzle is an EMB nozzle of eighteen millimeters (ID). The notches are modified accordingly. Desirable results are obtained.

EXAMPLE 3

The procedures of Example 1 are followed except that the foam precursor formulation therein is replaced by separate formulations of A and then B as set forth below:

| | Formulation A Parts by Weight | Formulation B Parts by Weight |
|---|---|---|
| Isocyanate (PAPI 901 from Upjohn) | 47.07 | 47.07 |
| Polyol Triol (Voranol 4701 from Dow Chemical 4800 MW; OH = 34) | 75 | 75 |
| Triol (Pluracol P-581 from BASF, Wyandotte Polyol with styrene-acrylonitrile copolymer dispersion; 6000 MW; OH = 26) | 20 | 20 |
| Diol (XA - 1610.01 from Dow Chemical; 4000 MW; OH = 37.5) | 5 | 5 |
| Triethanol/Diethanol amine (85/15 by weight) | 2 | 0.5 |
| Water | 2.5 | 2.5 |
| Tertiary Amine (Dabco 33-LV from Air Products) | 0.388 | 0.426 |
| Dimethyl Ethanol Amine (from Union Carbide) | 0.325 | 0.374 |
| Amine (Niax A-1 from Union Carbide) | 0.082 | 0.09 |
| Carbon Black Pigment | 1-2 | 1-2 |

What is claimed is:

1. A method for manufacture of a contoured panel that has a flexible side, a rigid side and a flexible foam therebetween, which method comprises:
   A. providing a contoured cavity in a mold, said cavity having definition comprising:
   1. a flexible sheet having its inner area conforming to and optionally drawn by vacuum against a first member of said mold, said inner area comprising a generally desired configuration for a first side of said panel and a border of said flexible sheet having runner and gate halves;
   2. a rigid sheet comprising substantially the desired configuration for a second side of said panel, having its inner area (a) selectively spaced from said inner area of said flexible sheet and (b) held by a second member of said mold in spaced relation to said flexible sheet and the border of said rigid sheet having runner and gate halves;

3. closure of said mold members clamping borders of said rigid and flexible sheets along a peripheral portion of said cavity, said closure being interrupted by (a) an injection port for injection of liquid foam precursors and (b) an exhaust vent for exhaust of air from said cavity;

4. said clamped sheets forming: (a) a runner communicating with said injection port and extending from said injection port to a location within said cavity remote from said injection port so as to direct passage of foam precursors to said location after their injections; and (b) a gate communicating between said runner and said cavity, said gate adapted to meter foam precursors from said runner into said cavity;

B. injecting under pressure an amount of foam precursors, sufficient to fill said cavity with said foam, through said injection port, into said runner and through said gate so as to provide a flow front of foam precursors at least about as long as said runner, which flow front travels into said cavity.

2. The method in accordance with claim 1, wherein said flexible sheet comprises a vacuum formed vinyl and is drawn by vacuum against said first member in said cavity.

3. The method in accordance with claim 2, wherein said rigid sheet comprises plastic.

4. The method in accordance with claims 1, or 2 or 3, wherein said liquid foam precursors comprise a polyurethane foam precursors.

5. The method in accordance with claim 4, wherein said flexible foam has a density between about 6-8 lb./cu. ft.

6. A panel made in accordance with claim 4.

7. A method for manufacture of a contoured panel that has a flexible decorative front, a rigid plastic back and a flexible foam therebetween, which method comprises:

A. providing a contoured cavity in a mold, said cavity having upper and lower portions and definition comprising:
1. a flexible plastic sheet having its inner area conforming to and optionally drawn by vacuum against a first member of said mold, said inner area comprising a generally desired configuration for a first side of said panel and a border of said flexible sheet having runner and gate halves;
2. a rigid sheet comprising substantially the desired configuration for a second side of said panel, having its inner area (a) selectively spaced from said inner area of said flexible sheet and (b) held by a second member of said mold in spaced relation to said flexible sheet and the border of said rigid sheet having runner and gate halves;
3. border engagement by said mold members of borders of said rigid and flexible sheets along a peripheral portion of said cavity at said upper portion of said cavity, said engagement forming a runner and gate in said border and being interrupted by (a) an injection port for injection of liquid foam precursors; (b) an exhaust vent for exhaust of air from said cavity; (c) said runner communicating with said injection port and extending along either side of said injection port to respective first and second locations within said cavity remote from said injection port and one another so as to direct passage of foam precursors to said first and second locations after their injection; and (d) said gate communicating between said runner and said cavity, said gate adapted to meter foam precursors into said cavity from said runner;

B. injecting under pressure an amount of foam precursors sufficient to fill said cavity with said foam through said injection port, into said runner and through said gate so as to provide a flow front of foam precursors at least about as long as said runner, which flow front travels to said lower portion of said cavity, foams to fill said cavity with said foam and expels air from said exhaust vent.

8. The method in accordance with claim 7, wherein said flexible sheet comprises a vacuum foamed vinyl.

9. The method in accordance with claim 8, wherein said rigid sheet comprises injection molded thermoplastic.

10. The method in accordance with claims 7 or 8 or 9, wherein said liquid foam precursors comprise a polyurethane foam precursors.

11. The method in accordance with claim 10, wherein said flexible foam has a density between about 6-8 lb./ft$^3$.

12. A panel made in accordance with claim 11.

13. A method for manufacture of a soft feel panel that has a flexible decorative front, a rigid plastic back and a flexible foam therebetween, which method comprises:

A. providing a cavity in a mold, said cavity having definition comprising:
1. a flexible sheet having its inner area conforming to and optionally drawn by vacuum against a first mold member, said inner area comprising a generally desired configuration for a first side of said panel and said first mold member being heated said flexible sheet having a border with runner and gate halves;
2. a rigid plastic sheet comprising substantially the desired configuration for a second side of said panel, having its inner area (a) selectively spaced from said inner area of said flexible sheet and (b) held by a second mold member in spaced relation to said flexible sheet said rigid plastic sheet having a border with runner and gate halves;
3. closure of said mold members clamping borders of said rigid and flexible sheets along a peripherial portion of said cavity and forming a runner and gate therein, said closure being interrupted by (a) an injection port for injection of liquid foam precursors; (b) an exhaust vent for exhaust of air from said cavity; (c) said runner communicating with said injection port and extending from said injection port to first and second locations remote from said injection port and one another to direct passage of foam precursors after their injection; and (d) said gate communicating between said runner and said cavity, said gate adapted to meter foam precursors into said cavity from said runner; and
4. inner engagement by said second mold member in the interior of said cavity of an inner portion of said inner area of said flexible and rigid sheets, said inner portion of said rigid sheet surrounding an opening in said rigid sheet, said inner engagement sealing said cavity from said opening in said sheet; and B. injecting under pressure an amount of foam precursors sufficient to fill said cavity with said foam through said injection port, into said runner and through said gate so as to provide a flow front of foam precursors at least about as long as said runner, which flow front travels into said cavity.

14. The method in accordance with claim 13, wherein said flexible sheet comprises a vacuum formed vinyl.

15. The method in accordance with claim 14, wherein said rigid sheet comprises thermoplastic.

16. The method in accordance with claims 13 and 14 or 15, wherein said liquid foam precursors comprise polyurethane foam precursors.

17. The method in accordance with claim 16, wherein said foam has a density between 6 and 8 pounds per cubic foot.

18. A panel made in accordance with claim 17.

19. A method for manufacture of a contoured panel that has a flexible decorative front, a rigid plastic back and a flexible foam therebetween, which method comprises:
   A. providing a cavity in a heated mold, said cavity having definition comprising:
      1. a flexible sheet having its inner area conforming to and drawn by vacuum against a first member of said mold, said inner area comprising a generally desired configuration for a first side of said panel and the border of said flexible sheet having runner and gate halves;
      2. a rigid plastic sheet comprising substantially the desired configuration for a second side of said panel, having its inner area (a) selectively spaced from said inner area of said flexible sheet and (b) held by a second member of said mold in spaced relation to said flexible sheet and the border of said rigid plastic sheet having runner and gate halves;
      3. closure of said mold members clamping borders of said rigid and flexible sheets along a peripheral portion of said cavity, said closure being interrupted by an injection port for injection of liquid precursors, and an exhaust port of air from said cavity;
      4. said clamped sheets forming: (a) a runner communicating with said injection port and extending from said injection port to a location within said cavity remove from said injection port to direct passage of foam precursors after their injection; and (b) a gate communicating between said runner and said cavity, said gate adapted to meter foam precursors from said runner into said cavity;
   B. injecting under pressure an amount of foam precursors sufficient to fill said cavity with said foam through said injection port, into said runner and through said gate so as to provide a flow front of foam precursors that travel into said cavity.

20. The method in accordance with claim 19, wherein said flexible sheet comprises a vacuum formed vinyl.

21. The method in accordance with claim 20, wherein said rigid sheet comprises thermoplastic.

22. The method in accordance with claims 19 or 20 or 21, wherein said liquid foam precursors comprise polyurethane foam precursors.

23. The method in accordance with claim 22, wherein said foam has a density between 6 and 8 pounds per cubic foot.

24. A panel made in accordance with claim 23.

* * * * *